United States Patent
Inoue et al.

(10) Patent No.: US 9,592,489 B2
(45) Date of Patent: Mar. 14, 2017

(54) METAL-ADSORBING GEL AND ADSORBENT SUPPORTING METAL-ADSORBING GEL

(71) Applicant: NIPPON FILCON CO., LIMITED, Inagi-shi, Tokyo (JP)

(72) Inventors: Yoshinori Inoue, Inagi (JP); Takehiro Kajiwara, Inagi (JP); Toshifumi Katoh, Inagi (JP); Mitsuru Saito, Inagi (JP)

(73) Assignee: NIPPON FILCON CO., LIMITED, Tokyo (JP)

( * ) Notice: Subject to any disclaimer, the term of this patent is extended or adjusted under 35 U.S.C. 154(b) by 0 days.

(21) Appl. No.: 14/375,014

(22) PCT Filed: Jan. 27, 2013

(86) PCT No.: PCT/JP2013/051679
§ 371 (c)(1),
(2) Date: Jul. 28, 2014

(87) PCT Pub. No.: WO2013/121863
PCT Pub. Date: Aug. 22, 2013

(65) Prior Publication Data
US 2015/0069292 A1   Mar. 12, 2015

(30) Foreign Application Priority Data

Feb. 14, 2012 (JP) ................................. 2012-029109

(51) Int. Cl.
| | | |
|---|---|---|
| B01J 20/26 | (2006.01) |
| B01J 41/14 | (2006.01) |
| B01J 41/04 | (2006.01) |
| B01J 20/28 | (2006.01) |
| B01J 20/30 | (2006.01) |
| C02F 1/28 | (2006.01) |
| C08J 3/24 | (2006.01) |
| B01J 41/12 | (2006.01) |
| B01J 20/32 | (2006.01) |
| C02F 101/20 | (2006.01) |

(52) U.S. Cl.
CPC ....... *B01J 20/267* (2013.01); *B01J 20/28026* (2013.01); *B01J 20/28033* (2013.01); *B01J 20/28047* (2013.01); *B01J 20/3007* (2013.01); *B01J 20/3282* (2013.01); *B01J 41/046* (2013.01); *B01J 41/125* (2013.01); *B01J 41/14* (2013.01); *C02F 1/285* (2013.01); *C02F 1/288* (2013.01); *C08J 3/24* (2013.01); *C02F 2101/20* (2013.01)

(58) Field of Classification Search
CPC ............................... B01J 20/267; C02F 1/285
USPC ........................................ 252/176; 525/328.2
See application file for complete search history.

(56) References Cited

U.S. PATENT DOCUMENTS

| | | | | |
|---|---|---|---|---|
| 5,629,385 A | * | 5/1997 | Kuo ........................... | 525/328.2 |
| 2005/0115462 A1 | * | 6/2005 | Disalvo et al. ............... | 106/403 |
| 2005/0288182 A1 | * | 12/2005 | Torii et al. .................... | 502/402 |
| 2006/0247351 A1 | * | 11/2006 | Torii et al. .................... | 524/406 |
| 2008/0032888 A1 | * | 2/2008 | Nakamura et al. ........... | 502/402 |
| 2012/0132852 A1 | * | 5/2012 | Inoue et al. .................. | 252/184 |
| 2015/0069292 A1 | * | 3/2015 | Inoue et al. .................. | 252/176 |

FOREIGN PATENT DOCUMENTS

| | | | | |
|---|---|---|---|---|
| CA | 2318495 A1 | * | 7/1999 | |
| CN | 101367573 B | | 10/2011 | |
| JP | 54-68900 A | | 6/1979 | |
| JP | 2001-113272 A | | 4/2001 | |
| JP | 3247704 B2 | | 1/2002 | |
| JP | 2005021883 A | * | 1/2005 | .............. B01J 45/00 |
| JP | 2005-213477 A | | 8/2005 | |
| JP | 2006-326465 A | | 12/2006 | |
| JP | 2007-247104 A | | 9/2007 | |

(Continued)

OTHER PUBLICATIONS

International Search Report dated Apr. 2, 2013 issued in correponding application No. PCT/JP2013/051679.
N. Hojo, "Kireto Jushi/Ion-Kokan Jushi (Chelate Resin/Ion-Exchange Resin)", Kodansha Scientific (1976).
M. Senoo et al., "Ion-Kokan, Kado-Bunri Gijutsu no Kiso (Ion Exchange, Foundation of High Separation Technology)", Kodansha Scientific (1991).

(Continued)

*Primary Examiner* — Nicole M Buie-Hatcher
*Assistant Examiner* — M. Reza Asdjodi
(74) *Attorney, Agent, or Firm* — Westerman, Hattori, Daniels & Adrian, LLP

(57) ABSTRACT

Problem
The present invention provides, in a metal-adsorbing material used for the removal and recovery of a wide range of heavy metals in treated solutions such as industrial waste water, service water, and environmental water, a gel-like metal-adsorbing material having a large amount of metal adsorption and capable of meeting various demands; and also provide a metal adsorbent having a gel-like metal-adsorbing material supported on a porous carrier.
Means for Resolution
A metal-adsorbing polymer selected from polyethyleneimine and polyallylamine is crosslinked with a polyglycidyl ether, whereby a gel-like metal-adsorbing material having a large amount of metal adsorption and capable of meeting various demands is produced. Further, a hydrophilic porous carrier is impregnated with a metal-adsorbing polymer, followed by crosslinking with a polyglycidyl ether, whereby a metal adsorbent having a gel-like metal-adsorbing material supported on the porous carrier, which has a large amount of metal adsorption and can meet various demands, is produced.

3 Claims, 3 Drawing Sheets

(56) References Cited

FOREIGN PATENT DOCUMENTS

| | | | |
|---|---|---|---|
| JP | 2008-115439 A | 5/2008 | |
| JP | 4119966 B2 | 7/2008 | |
| JP | 2010-138430 A | 6/2010 | |
| JP | 2010-194509 A | 9/2010 | |
| JP | 2011-56349 A | 3/2011 | |
| JP | 2011-56350 A | 3/2011 | |
| JP | 2011056350 A * | 3/2011 | |
| JP | 2011-88047 A | 5/2011 | |
| JP | 2011-92864 A | 5/2011 | |
| JP | 2011088047 A * | 5/2011 | |
| JP | 2011-183376 A | 9/2011 | |
| JP | 2011183376 A * | 9/2011 | |
| WO | 91/19675 A1 | 12/1991 | |
| WO | WO 9119675 A1 * | 12/1991 | B01J 20/22 |

OTHER PUBLICATIONS

N. Toshima et al, "Kinosei Kobunshi Zairyo no Kagaku (Chemistry of Functional Polymer Material)", Asakura Publishing (1998).
Edited by Y. Kanzaki, Japan Society of Ion Exchange, "Saisentan Ion-Kokan Gijutsu no Subete (All about Latest Ion-Exchange Techniques)", Kogyo Chosakai Publishing (2009).
K. Oshita et al., "Kireto-Jushi no Kaihatu to Sono Bunri/Noshuku Tokusei (Development of Chelating Resin and Its Separation/Concentration Properties)", Analytical Chemistry, vol. 57, No. 5, pp. 291-311 (2008).
Dojindo Catalog, Dojindo Laboratories, 26th edition, pp. 320-321, cited in the Specification, Mar. 9, 2008.
L.G. Sillen et al., "Stability Constants of Metal-Ion Complexed" 2nd Ed., Special Publication No. 17, the Chemical Society, London (1964).

* cited by examiner

500 μm

Fig.2a) Polyvinyl-alcohol-based form
   Before supporting gel-like adsorbing material Fig.2b) Polyvinyl-alcohol-based form
   After supporting gel-like adsorbing material Fig.2c) Melamine-based foam
   Before supporting gel-like adsorbing material Fig.2d) Melamine-based foam
   After supporting gel-like adsorbing material

US 9,592,489 B2

METAL-ADSORBING GEL AND ADSORBENT SUPPORTING METAL-ADSORBING GEL

TECHNICAL FIELD

The present invention relates to a metal-adsorbing material used for the removal and recovery of a wide range of heavy metals in treated solutions such as industrial waste water, service water, and environmental water.

BACKGROUND ART

Heavy metals are highly poisonous and also are highly likely to remain in the soil or concentrate in the living body. Therefore, it is necessary to remove them from industrial waste water, service water, environmental water, food products, chemicals, etc., as much as possible. In addition, a large amount of rare metal is contained in discarded electronic devices, which is a precious resource called "urban mine." Therefore, technologies related to the recovery of valuable metals contained therein have been developed. As a technique for removing heavy metals from a treated liquid, various methods have been practiced, including coagulation sedimentation. As advanced removal/recovery methods, methods using ion-exchange resins and chelating resins have been widely used. Generally, these treated liquids contain high concentrations of salts and organic substances. Thus, the removal of heavy metals with ion-exchange resins is often difficult, and it is said that the removal and recovery can be performed more efficiently using a chelating resin.

A chelating resin is used as a material for the adsorption and recovery of heavy metal elements in a solution containing high concentrations of salts, which is difficult using an ion-exchange resin (see Nonpatent Documents 1 to 4). The ability to form a complex with a metal element differs depending on the functional group structure, and thus chelating resins having various functional groups, such as an iminodiacetic acid (IDA) group, a low-molecular-weight polyamine group, an aminophosphate group, an isothionium group, a dithiocarbamic acid group, and a glucamine group, have been developed (see Patent Document 5). Among them, chelating resins that are commercially available and having introduced thereinto an IDA group having high general versatility are mainly used. However, in the case of an IDA-type chelating resin, because of obstruction by alkali metals or alkaline earth metals, it is often difficult to remove and recover small amounts of metals from a solution having a high salt concentration. In addition, although an IDA-type chelating resin forms a complex with a large number of metals, the stability constant of the formed complex is considerably lower as compared with ethylenediaminetetraacetic acid (EDTA), which is a typical chelating agent. The low stability constant is a major factor of the fluctuation in the removal and recovery due to obstruction by coexistent elements.

It is known that in a chelating agent of a polyaminocarboxylic acid type, such as IDA or EDTA, the stability constant of a complex tends to increase with an increase in the repetition of ethyleneimine (an increase in the chain length) (see Nonpatent Document 6 and Nonpatent Document 7). A chelating resin having an aminocarboxylic-acid-type functional group with an increased chain length has been disclosed. Patent Document 1 discloses a diethylentriamine-N,N,N',N'-tetraacetic acid type, which has been carboxymethylated by the introduction of diethylenetriamine, while Patent Document 2 discloses a diethylenetriamine-N,N',N'',N'''-tetraacetic acid type, which has been carboxymethylated by the introduction of diethylenetriamine, etc. Although there is no clear description, it is understood that these chelating resins have a higher stability constant than IDA-type resins. Further, it is expected that by increasing the functional group chain length, the stability constant of a complex can be improved, and also a plurality of metals can be adsorbed into one molecule. Patent Document 3 discloses a chelating resin having a functional group obtained by partially carboxymethylating polyethyleneimine having an average molecular weight of 200 to 600. This chelating resin has adsorption capacity obviously higher than that of an IDA-type chelating resin, and an improvement is seen in stability constant due to an increase in the chain length of the functional group. Another feature of the chelating resin is that it is resistant to obstruction by alkali metals or alkaline earth metals.

Unlike the conventional production method in which a chelating functional group is introduced into a certain carrier, it is also possible to produce a chelating resin by crosslinking a chelating polymer or a polymer capable of forming a chelating functional group. Nonpatent Document 5 also reports a study of producing a chelating resin by crosslinking chitosan, which is a polysaccharide having an amino group. As a crosslinking agent for chitosan, epichlorohydrin, glutaraldehyde, ethylene glycol diglycidyl ether, or the like is used. Nonpatent Document 5 shows the usefulness of chelating resins obtained by crosslinking a chelating polymer, but they are all in the laboratory level. Although chitosan can be easily industrially obtained, it is not necessarily inexpensive. In addition, the acid resistance of chitosan itself is not high. Therefore, there are a large number of problems in application to the actual removal and recovery of metals.

Meanwhile, the form of an adsorbing material is also problematic. A chelating resin is a particulate adsorbing material like activated carbon and ion-exchange resins and has been used in a wide range of fields including a wastewater treatment and a water purification treatment. A water treatment technique using these particulate adsorbing materials has already been established and is expected to be heavily used also in the future. However, because it has a particulate form, such a particulate adsorbing material has to be packed in a specific can and used. Therefore, it may be difficult to adapt to some conditions of use or some installation environments. That is, in order to meet various demands, it is necessary to improve not only the adsorption characteristics of an adsorbing material, but also its form.

In order to solve such a problem, a fibrous chelating adsorbing material that can be easily processed into various forms and can meet various demands has been proposed. Patent Document 4 discloses fibers having a chelating functional group introduced thereinto by a chemical grafting method. Patent Documents 5 and 6 radical formation by radiation exposure and fibers having a chelating functional group introduced thereinto by a graft polymerization method. Patent Documents 7 and 8 disclose chelating fibers obtained by wet blend spinning. These chelating fibers are likely to have sufficient functions and show quick-adsorption characteristics. However, they have some problems in the production method. In a chemical grafting method, the kind of graftable fiber is limited, and also the production process is complicated. A radiation grafting method is advantageous in that it can be applied to various fibers as compared with the chemical grafting method. However, for the handling of radiation, the operation is performed in a specific environment, and thus it cannot be regarded as a simple and inexpensive production method. Meanwhile, according to the wet blend-spinning method disclosed in Patent Documents 7 and 8, a polymer having chelating ability is subjected to wet blend spinning together with viscose, which allows for mass production at low cost using existing facilities. In addition, because a polymeric functional group is used, like the chelating resin having a long-chain functional group shown in Patent Document 3, high adsorption characteristics are shown. However, the production of chelating fibers having different adsorption characteristics has a problem in that a polymer suited to the desired adsorption characteristics has to be synthesized each time.

Patent Document 9 discloses fibers obtained using a method for injecting a low-molecular-weight chelating agent under high-temperature and high-pressure conditions. The chelating agent injection/impregnation method is advantageous in that existing fibers and cloths can be used, and also that the kind of chelating agent can be changed to easily achieve diversification. However, according to the disclosed conditions, a supercritical fluid such as carbon dioxide is the most effective, and also the pressurizing conditions include an extremely high pressure of 100 atm ($9.8 \times 10^6$ pa) to 250 atm ($2.45 \times 10^7$ pa). Therefore, it cannot be necessarily regarded as a simple production method.

CITATION LIST

Patent Document

Patent Document 1: Japanese Unexamined Patent Application Publication No. 2008-115439
Patent Document 2: Japanese Unexamined Patent Application Publication No. 2005-213477
Patent Document 3: Japanese Unexamined Patent Application Publication No. 2010-194509
Patent Document 4: Japanese Unexamined Patent Application Publication No. 2001-113272
Patent Document 5: Japanese Patent No. 4119966
Patent Document 6: Japanese Patent No. 3247704
Patent Document 7: Japanese Unexamined Patent Application Publication No. 2011-056349
Patent Document 8: Japanese Unexamined Patent Application Publication No. 2011-056350
Patent Document 9: Japanese Unexamined Patent Application Publication No. 2007-247104

Non-Patent Document

Non-Patent Document 1: Nobumasa HOJO, "*Kireto Jushi/Ion-Kokan Jushi* (Chelate Resin/Ion-Exchange Resin)", Kodansha Scientific (1976).
Non-Patent Document 2: Manabu SENOO, Mitsuo ABE, Takashi SUZUKI, "*Ion-Kokan, Kodo-Bunri Gijutsu no Kiso* (Ion Exchange, Foundation of High Separation Technology)", Kodansha Scientific (1991).
Non-Patent Document 3: Naoki TOSHIMA, Tsuyoshi ENDO, Ryuichi YAMAMOTO, "*Kinosei Kobunshi Zairyo no Kagaku* (Chemistry of Functional Polymer Material)", Asakura Publishing (1998).
Non-Patent Document 4: Edited by Yasushi KANZAKI, Japan Society of Ion Exchange, "*Saisentan Ion-Kokan Gijutsu no Subete* (All about Latest Ion-Exchange Techniques)", Kogyo Chosakai Publishing (2009).
Non-Patent Document 5: Koji OSHITA, Shoji MOTOMIZU, "*Kireto-Jushi no Kaihatu to Sono Bunri/Noshuku Tokusei* (Development of Chelating Resin and Its Separation/Concentration Properties)", Analytical Chemistry, Vol. 57, No. 5, pp. 291-311 (2008)
Non-Patent Document 6: Dojindo Catalog, $26^{th}$ ed., pp. 320-321
Non-Patent Document 7: L. G. Sillen, A. E. Martell, Stability Constants of Metal-Ion Complexes 2nd Ed., the Chemical Society, London (1964).

SUMMARY OF THE INVENTION

Problems that the Invention is to Solve

The present invention has been accomplished in view of the problems mentioned above. An object of the present invention is to provide, in a metal-adsorbing material used for the removal and recovery of a wide range of heavy metals in treated solutions such as industrial waste water, service water, and environmental water, a gel-like metal-adsorbing material having a large amount of metal adsorption and capable of meeting various demands; and also provide a metal adsorbent having a gel-like metal-adsorbing material supported on a porous carrier.

Means for Solving the Problems

The present inventors have conducted intensive research. As a result, they have found that a gel-like metal-adsorbing material obtained by crosslinking a metal-adsorbing polymer selected from polyethyleneimine and polyallylamine with a polyglycidyl ether has a large amount of metal adsorption. They have also found that when a suitable porous carrier is impregnated with the metal-adsorbing polymer, followed by crosslinking in the same manner, the resulting metal adsorbent having a gel-like metal-adsorbing material supported serves as a metal-adsorbing material that shows high metal adsorption capacity and can meet various demands. The present invention has been accomplished based on these findings.

The present invention relates to a gel-like metal-adsorbing material obtained by crosslinking a metal-adsorbing polymer selected from polyethyleneimine and polyallylamine with a polyglycidyl ether. Polyethyleneimine and polyallylamine may each be partially carboxymethylated.

In the present invention, the metal-adsorbing polymer is crosslinked in a solution to form a gel-like metal-adsorbing material. In addition, it may also be a metal adsorbent having a gel-like metal-adsorbing material supported, which is obtained by impregnating a hydrophilic porous carrier with a metal-adsorbing polymer, followed by crosslinking with a polyglycidyl ether.

Examples of hydrophilic porous carriers used in the present invention include foaming polymers, cloths such as nonwoven fabrics, woven fabrics, and knitted fabric, resin-sintered porous bodies, porous ceramics, and porous glasses.

Technical subject matters related thereto will be described in further detail in the section of Mode for Carrying Out the Invention.

Advantage of the Invention

According to the present invention, a metal-adsorbing polymer selected from polyethyleneimine and polyallylamine is crosslinked with a polyglycidyl ether, whereby a gel-like metal-adsorbing material having high metal adsorption capacity and capable of meeting various demands is produced. The gel-like metal-adsorbing material is characterized in that it releases water retained therein upon metal adsorption, and thereby shrinks in volume. As a result, it is possible to reduce the cost of metal recovery and also the number of processes. Further, the technique of producing a gel-like metal-adsorbing material in a porous carrier makes it possible to produce a metal adsorbent having a large amount of metal adsorption and capable of meeting various demands using existing porous carriers in various forms.

Figure 2A:
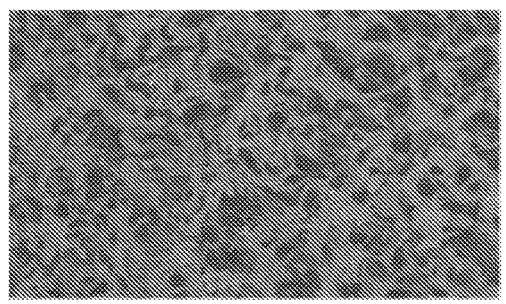
FIGS. 2a) to 2d) show photographs of polymer-foam-supported metal adsorbents of Example 4 before and after copper adsorption.

The photograph of FIG. 2a) shows a polyvinyl-alcohol-based foam before supporting a gel-like metal-adsorbing material.

Figure 2B:
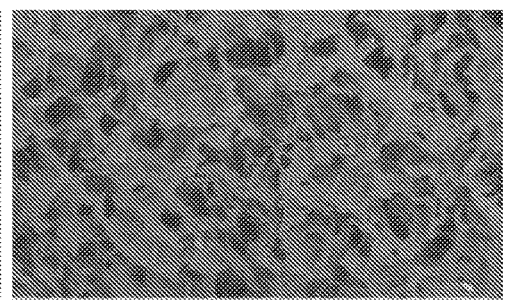

The photograph of FIG. 2b) shows a polyvinyl-alcohol-based foam after supporting a gel-like metal-adsorbing material.

Figure 2C:
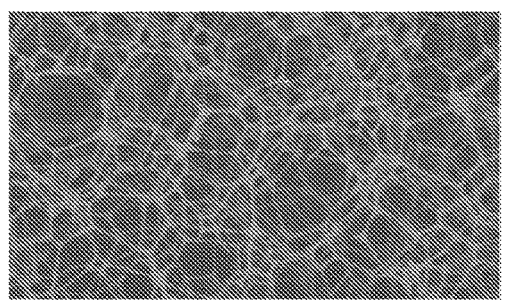

The photograph of FIG. 2c) shows a melamine-based foam before supporting a gel-like metal-adsorbing material.

Figure 2D:
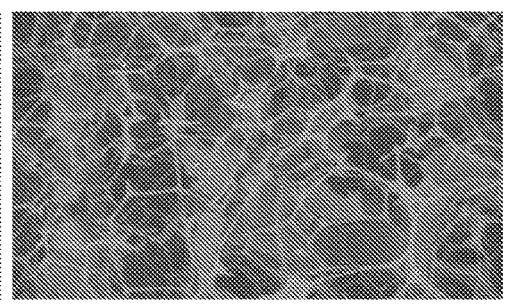

The photograph of FIG. 2d) shows a melamine-based foam after supporting a gel-like metal-adsorbing material.

Figure 3:
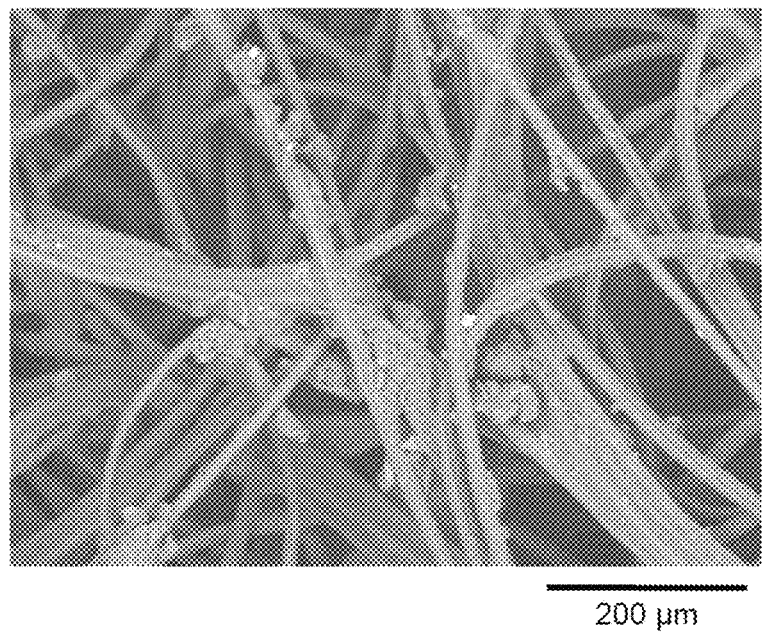

FIG. 3 shows an electron micrograph of a nonwoven fabric B supporting a gel-like metal-adsorbing material of Example 5.

DETAILED DESCRIPTION OF THE PREFERRED EMBODIMENTS

The present invention relates to a gel-like metal-adsorbing material obtained by crosslinking a metal-adsorbing polymer selected from polyethyleneimine and polyallylamine with a polyglycidyl ether. Polyethyleneimine and polyallylamine may each be partially carboxymethylated.

The metal-adsorbing polymer selected from polyethyleneimine and polyallylamine used in the present invention can be used not only for the adsorption of heavy metals but also for the adsorption of noble metals. In addition, they may also be used as weak anion-exchange resins. It is preferable that the polyethyleneimine and polyallylamine in the present invention are polymers having a high molecular weight. By using a polymer having a high molecular weight, a large number of amino groups or imino groups, which serve as crosslinking sites, are present in the molecule, making it easy to adjust the degree of crosslinking, hardness, the amount of hydration, and the degree of swelling. In addition, because of an increase in the molecular chain length, the stability constant of the formed complex increases, and also a large number of metals are adsorbed in the molecular chain. Further, it is estimated that the polymer chain extends in water, resulting in an increase in flexibility. Meanwhile, when the molecular weight is low, this leads to high crosslinking density, resulting in an adsorbing agent that is hard and difficult to swell. Therefore, even when the apparent amount of adsorptive functional groups is large, in an actual adsorption treatment, the adsorptive functional groups inside the gel do not function effectively. Therefore, an adsorbing material with excellent adsorption efficiency having a large amount of metal adsorption is not achieved. Accordingly, the polymer used has a molecular weight of 600 to 500,000, and preferably a molecular weight of 600 to 100,000.

Metals to be adsorbed by polyethyleneimine or polyallylamine are limited. However, in other words, this means high selectivity. However, because the kind of metal that can be adsorbed is limited, general versatility is poor. Therefore, the gel-like metal-adsorbing material after crosslinking is carboxymethylated with halogenated acetic acid, whereby general versatility can be improved. The carboxymethylation of polyethyleneimine and polyallylamine allow them to perform EDTA-like and IDA-like metal adsorption, respectively, whereby general versatility is improved.

As mentioned above, general versatility can be improved by the carboxymethylation of polyallylamine and polyethyleneimine after crosslinking. However, it is difficult to efficiently carboxymethylate the inside of the gel-like metal-adsorbing material, and its operation is also complicated. Thus, polyallylamine or polyethyleneimine partially carboxymethylated such that amino groups or imino groups remain in the molecule may be previously prepared using a solution reaction, followed by a crosslinking reaction, thereby giving a gel-like metal-adsorbing material having a high degree of carboxymethylation. The partial carboxymethylation of polyallylamine or polyethyleneimine is adjusted by the amount of halogenated acetic acid used. Generally, carboxymethylation is performed with the molar amount being 0.1 to 4 times the nitrogen amount in the polymer having a large number of amino groups or imino groups in the molecule. Incidentally, polyethyleneimine is a branched polymer, and a carboxymethyl group is not introduced into the tertiary amine at the branched moiety. Therefore, like the remaining amino groups or imino groups, the tertiary amine at the branched moiety also serves as a crosslinking site.

In the present invention, a polyglycidyl ether is used for the crosslinking of a metal-adsorbing polymer. As is known (Nonpatent Document 5), epichlorohydrin or glutaraldehyde also allows for crosslinking, but because the molecular chain is short, it is difficult to achieve a flexible gel-like metal-adsorbing material. In addition, in case where crosslinking is performed with glutaraldehyde, because it is the bonding of a Schiff base, this leads to low chemical resistance and thus is undesirable. Therefore, a polyglycidyl ether having a plurality of glycidyl groups is used in the present invention. Examples of available polyglycidyl ethers include polyethylene glycol diglycidyl ethers such as ethylene glycol diglycidyl ether, polyglycerin polyglycidyl ethers such as glycerin polyglycidyl ether, alkylene glycol diglycidyl ethers such as butanediol diglycidyl ether, and further polyglycidyl ethers of polyols, such as trimethylolpropane, pentaerythritol, and sorbitol. The proportion of such a polyglycidyl ether (the degree of crosslinking: formula I) is 2 to 15 wt % relative to the metal-adsorbing polymer. When the degree of crosslinking is less than 2 wt %, this leads to an extremely soft gel-like substance, resulting in a decrease in working properties. Meanwhile, the metal adsorption increases with an increase in the degree of crosslinking, leading to higher hardness and better working properties. However, when the degree of crosslinking is 15% or more, no increase in metal adsorption can be expected.

[Formula 1]

$$\text{Degree of crosslinking (wt \%)} = \frac{\text{Weight of polyglycidylether}}{\text{Weight of metal-adsorpting polymer having a large number of amino groups or imino groups}} \times 100 \quad \text{Formula 1}$$

The gel-like metal-adsorbing material may be synthesized by adding a specific amount of a polyglycidyl ether, which serves as a crosslinking agent, to an aqueous solution of a metal-adsorbing polymer (5 to 40 wt %), followed by mixing and then heating to 40 to 80° C. to cause a reaction. The reaction time largely depends on the reaction temperature. At 50° C., the reaction mostly completes within several minutes to 30 minutes. By this method, a massive gel-like metal-adsorbing material can be obtained. After the completion of the reaction, it may be classified to the desired grain size using a suitable grinder. In order to obtain a spherical gel-like metal-adsorbing material, a mixed aqueous solution of the metal-adsorbing polymer and a polyglycidyl ether may be dispersed in a solvent immiscible with water, heated, and allowed to react. In addition, it is also possible to obtain a spherical gel-like metal-adsorbing material by adding the above mixed aqueous solution dropwise to a solvent immiscible with water, which has been heated to the reaction temperature and has a lower specific gravity than water, to cause a reaction. The gel-like metal-adsorbing material obtained by such a method may be directly used in the wet state, but may also be dried according to the purpose of use.

The gel-like metal-adsorbing material thus obtained may be used in various ways but is mainly used for batch processing, in which the adsorbing material is directly placed in a treatment solution. For example, the gel-like metal-adsorbing material is dried and placed in a wire mesh container having suitable openings, sufficiently swelled with water, and then placed in a treatment solution. The gel-like metal-adsorbing material of the present invention has the following properties. That is, it absorbs water in an amount 10 to 100 times its dry weight and swells. Therefore, when placed in water, the diameter increases twice to several times the original diameter. However, after metal adsorption, it releases the most of the absorbed moisture, whereby the diameter shrinks to 20 to 60% of the diameter at the maximum swelling. That is, the volume of the adsorbing material after a treatment is reduced, and also the step of dehydration can also be omitted, making it possible to reduce the treatment cost, the number of processes, and also the transportation cost. Naturally, also in the recovery of the metal from the adsorbing material after the adsorption treatment, because of the low moisture content, the costs related to combustion, melting, and also extraction recovery can be reduced.

The gel-like metal-adsorbing material is useful in the removal and recovery of metals. However, because of its particulate form, the conditions of use are limited. Thus, a metal adsorbent having a gel-like metal adsorbent formed in a hydrophilic porous carrier is produced. A metal-adsorbing polymer and a polyglycidyl ether are dissolved in a solution containing water or a water-soluble organic solvent, then a porous carrier is immersed in the mixed solution such that the mixed solution is retained in the pores of the porous carrier, and an excess of the mixed solution is removed, followed by heating to cause a reaction. As a result, a metal adsorbent having a gel-like metal-adsorbing material supported on the porous carrier can be obtained. However, the crosslinking reaction by a polyglycidyl ether proceeds quickly. Therefore, this method is inconvenient for industrially or continuously producing such a metal adsorbent. Thus, a metal-adsorbing polymer having a large number of amino groups or imino groups in the molecule is first dissolved in a solution containing water or a water-soluble organic solvent, and then a porous carrier is immersed in the solution to retain the solution containing the metal-adsorbing polymer. After removing an excess of the solution, a solution of a polyglycidyl ether containing water or a water-soluble organic solvent is sprayed from the outside of the porous carrier, followed by heating to cause a reaction. By using such a method, a metal adsorbent having a gel-like metal-adsorbing material supported on the porous carrier can be obtained continuously in a large amount.

Examples of hydrophilic porous carriers used in the present invention include foaming polymers, cloths such as nonwoven fabrics, woven fabrics, and knitted fabric, resin-sintered porous bodies, porous ceramics, and porous glasses. As materials for the porous carrier, hydrophilic materials are selected. When the material is hydrophilic, that is, has wettability with water, a solution containing the metal-adsorbing polymer is unlikely to be desorbed after immersion/impregnation, and also the gel-like metal-adsorbing material can be uniformly supported.

As mentioned above, a metal-adsorbing polymer having a large number of amino groups or imino groups is dissolved in a solution containing water or a water-soluble organic solvent, and a porous carrier material is impregnated therewith. Therefore, in the present invention, a porous carrier made of a hydrophilic material is selected. Porous ceramics and porous glasses show high wettability with water. However, some foaming polymers, cloths, and resin-sintered porous bodies are water repellent, and thus it is necessary to select suitable materials. Examples of hydrophilic materials for foaming polymers include melamine-based, urethane-based, and polyvinyl-alcohol-based materials. However, a polyvinyl alcohol having a high degree of saponification dissolves in water. Therefore, those made from partially formulated polyvinyl alcohols, crosslinked polyvinyl alcohols, or copolymers with other monomers as raw materials are used. As cloths, those obtained by blend-spinning a plurality of fibers can be used, but blend-spun cloths containing hydrophilic fibers, such as nylon, rayon, and vinylon, are used. In addition, as resin-sintered porous bodies, although those made of polyethylene or polypropylene are easily obtainable, they are highly water repellent and thus are undesirable as porous carriers in the present invention. As hydrophilic resin-sintered porous bodies, those made from ethylene vinyl acetate copolymers, hydrophilic polyesters, and the like as raw materials are used. In addition, it is also possible to use those having hydroxyl groups, carboxyl groups, and the like introduced into the resin surface by a plasma treatment.

In addition, the porous structure of the porous carrier is not particularly limited either, but when the pores are continuous, a metal adsorbent having a large supporting amount can be obtained. Further, the external form of the porous carrier may be any form, and the present invention allows it to be impregnated with and support the gel-like metal-adsorbing material. Further, a metal adsorbent supported on a cloth or the like can be easily processed into another form by secondary processing. The pore size of the porous carrier is not particularly limited either and is selected according to the purpose of use. For example, in the case where it is used for a dipping treatment, when the pore size is small, the pores are blocked due to the production of a gel-like metal-adsorbing material, whereby dipping cannot be performed. Therefore, a porous carrier having a pore size of about 0.5 to several millimeters is required. However, there is a problem in that an increase in pore size decreases the specific surface area and also reduces the amount of the gel-like metal-adsorbing material supported. Thus, a porous carrier having large pores of about 0.5 to several millimeters and also small pores of 0.5 mm or less or, alternatively, a porous carrier having wide pore distribution is used. Although the problem of pore size is not serious in the case of a surface adsorption treatment, it is preferable to use a porous carrier having a pore size such that the inside of the porous carrier can be easily impregnated with a solution containing a metal-adsorbing polymer having a large number of amino groups or imino groups, and the gel-like metal-adsorbing material is supported thereon in a large amount.

Next, the present invention will be described with reference to the examples, but the present invention is not limited thereto.

Example 1

Production of Gel-Like Metal-Adsorbing Material of Carboxymethylated Polyallylamine Type Ethylene glycol diglycidyl ether was added to 100 mL of an aqueous polyallylamine solution having an average molecular weight of 1,600 (15 wt %) and allowed to react at 50° C. for 1 hour, thereby giving a gel-like polymer mass. At this time, the amount of ethylene glycol diglycidyl ether added was changed from 0.4 to 2.0 mL to prepare gel-like polymer masses having crosslinking degrees of 1.0 to 5.0 wt %. The obtained gel-like polymer masses were each crushed, added to a solution prepared by dissolving 96 g of sodium monochloroacetate in a 1.0 M aqueous sodium hydroxide solution, and allowed to react at 60° C. for 4 hours, thereby performing N-carboxymethylation. The reaction product was removed by filtration and washed with water and then with methanol. The four kinds of gel-like metal-adsorbing materials obtained having different degrees of crosslinking were immersed in a 100 mg/L copper sulfate solution adjusted to pH 5.5 to adsorb copper. From the amount of copper loss from the copper solution, the amount of copper adsorption of each gel-like metal-adsorbing material was determined. The results are shown in Table 1. The amount of copper adsorption tends to increase with an increase in the degree of crosslinking, but became substantially constant at a crosslinking degree of 2 wt % or more. In addition, the prepared gel-like metal-adsorbing materials were dried for 5 h in a thermostat bath at 110° C., then placed in water, allowed to stand for 15 h, removed by filtration, and then measured for weight changes. The degree of water absorption of each gel-like metal-adsorbing material determined by Equation 2 is also shown in Table 1. This value shows the amount of water retainable relative to the dry weight. For example, a gel-like metal-adsorbing material having a crosslinking degree of 1.5 to 2 wt % can retain water in an amount about 40 times its weight. The degree of water absorption tended to decrease with an increase in the degree of crosslinking.

[formula 2]

$$\text{Degree of water adsorption} = \frac{\text{Weight after water absorption of gel-like metal-absorpting material}}{\text{Dry weight of gel-like metal-absorpting material}} \quad \text{Formula 2}$$

TABLE 1

The Amount of Copper Adsorption and Degree of Water Absorption of Gel-Like Metal-Adsorbing Material

| Degree of Crosslinking % | The Amount of Copper Adsorption [mmol Cu/g] | Degree of Water Absorption |
|---|---|---|
| 1.0 | 1.11 | 34.7 |
| 1.5 | 2.21 | 42.3 |
| 2.0 | 2.20 | 35.7 |
| 3.0 | 2.33 | 27.4 |
| 5.0 | 2.33 | 16.5 |

Example 2

Production of Gel-Like Metal-Adsorbing Material of Partially Carboxymethylated Polyethyleneimine Type 125 g of polyethyleneimine having an average molecular weight of 10,000 (manufactured by Wako Pure Chemical Industries) was added to a 1 M aqueous sodium hydroxide solution having dissolved therein sodium chloroacetate (340 g) and then carboxymethylated at 60° C. for 6 hours with stirring. 4.0 mL of ethylene glycol diglycidyl ether (equivalent to a crosslinking degree of 7.5%) was mixed with 100 mL of the obtained partially carboxymethylated polyethyleneimine and allowed to react at 50° C. for 1 hours. In the same manner as in Example 1, the obtained gel-like metal-adsorbing material was crushed and immersed in a 100 mg/L copper sulfate solution adjusted to pH 5.5 to adsorb copper. From the amount of copper loss from the copper solution, the amount of copper adsorption of each gel-like metal-adsorbing material was determined. The result was 1.54 mmol/g, indicating clear copper adsorption. Incidentally, the degree of water absorption of the gel-like metal-adsorbing material was 3.2. This shows that a gel-like metal-adsorbing material similar to that of Example 1 can also be produced using a polyamine carboxymethylated such that amino groups or imino groups remain therein.

Example 3

Figure 1:
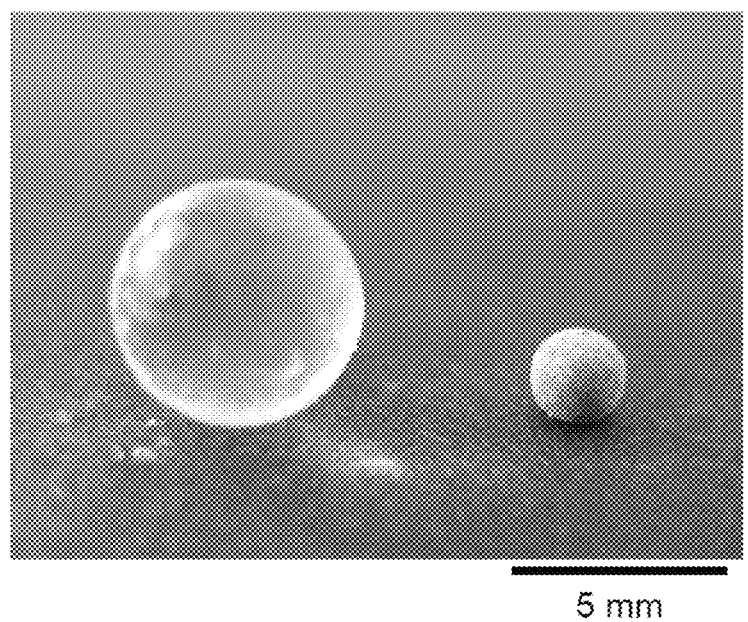
FIG. 1 show photographs of a spherical gel-like metal-adsorbing material of Example 3 before and after copper adsorption. Here, the left-hand large particle shows the spherical gel-like metal-adsorbing material before copper adsorption, and the right-hand small particle shows the spherical gel-like metal-adsorbing material after copper adsorption.

Production of Spherical Gel-Like Metal-Adsorbing Material 0.4 mL of ethylene glycol diglycidyl ether (equivalent to a crosslinking degree of 5.0%) was mixed with 20 mL of an aqueous polyallylamine solution having an average molecular weight of 1,600 (15 wt %). The mixture was added dropwise to chlorobenzene maintained at 60° C. using a syringe and allowed to react with stirring for 20 minutes, thereby giving a spherical gel-like metal-adsorbing material having a particle diameter of about 6 mm. The obtained spherical gel-like metal-adsorbing material was immersed in a 50 mg/L copper sulfate solution adjusted to pH 5.5 to adsorb copper. From the amount of copper loss from the copper solution, the amount of copper adsorption of the spherical gel-like metal-adsorbing material was determined. The result was 0.21 mmol/g. Photographs of the spherical gel-like metal-adsorbing material before and after copper adsorption are shown in FIG. 1. Water retained upon copper adsorption was discharged, whereby the particle diameter shrank from 6.0 mm to 2.1 mm. The volume was about 1/23.

Example 4

Production of Polymer-Foam-Supported Metal Adsorbent 15 g of polyethyleneimine having an average molecular weight of 10,000 (manufactured by Wako Pure Chemical Industries) was dissolved in 85 mL of pure water and mixed with 2.5 mL of ethylene glycol diglycidyl ether (equivalent to a crosslinking degree of about 5.0%). A polyvinyl-alcohol-based foam and a melamine-based foam were immersed in the solution for impregnation with the reaction solution. Subsequently, pressure was applied to press out an excess of the reaction solution, and a reaction was carried out in a thermostat bath at 50° C. for 1 hour. The obtained polymer foams supporting a gel-like metal-adsorbing material were immersed in a 100 mg/L copper sulfate solution adjusted to pH 5.5 to adsorb copper. From the amount of copper loss from the copper solution, the amount of copper adsorption of each polymer foam supporting a gel-like metal-adsorbing material was determined. The results are shown in Table 2. The obtained polymer foams supporting a gel-like metal-adsorbing material clearly adsorbed copper, but the amount of adsorption was different depending on the pore size and material of the foam. FIG. 2 shows each electron micrograph. It is shown that the polyvinyl-alcohol-based foam used in this test has a small pore size, and most of the pores are blocked with the produced gel-like metal-adsorbing material. Meanwhile, it is shown that in the melamine-based foam, most of the pores remain even after the production of the gel-like metal-adsorbing material. This leads to the estimation that in the polyvinyl-alcohol-based foam, due to blocking with the gel-like metal-adsorbing material, the copper solution hardly penetrated thereinto; as a result, the gel-like metal-adsorbing material in the pores was not effectively used, and adsorption took place only on the surface. These problems can be easily solved by controlling the pore size and the pore distribution of a polymer foam.

TABLE 2

The Amount of Copper Adsorption of Polymer Foam Supporting Gel-Like Metal-Adsorbing Materia

| Polymer Foam Material | The Amount of Copper Adsorption [mmol Cu/g] |
|---|---|
| Polyvinyl-Alcohol-Based | 0.82 |
| Melamine-Based | 2.23 |

Comparative Example 1

Support on Sintered-Resin Porous Body Made of Polyethylene

In the same manner as in Example 4, a gel-like metal-adsorbing material was supported on a sintered-resin porous body made of polyethylene (average pore size: 30 μm). The metal adsorptivity of the obtained sintered-resin porous body supporting a gel-like metal-adsorbing material was examined by the same method as in Example 4. The gel-like metal-adsorbing material supported on the sintered-resin porous body adsorbed copper and showed a strong blue color. However, a gel-like metal-adsorbing material leaked from the sintered-resin porous body was found at the bottom of the beaker. While immersed in the copper solution, the porous body was subjected to ultrasonic waves. As a result, the leakage of the gel-like metal-adsorbing material increased. This result leads to the estimation that the wettability of a carrier affects the support of a gel-like metal-adsorbing material, showing that it is difficult to support it on a highly water-repellent material.

Example 5

Production of Nonwoven-Fabric-Supported Metal Adsorbent

Three kinds of nonwoven fabrics (5 mm in thickness) having different blend-spinning ratios were produced by a needle-punching method. These three kinds of nonwoven fabrics were immersed in a 15% aqueous solution of polyethyleneimine having an average molecular weight of 10,000 (manufactured by Wako Pure Chemical Industries), and pressure was applied to press out an excess of the reaction solution. Ethylene glycol diglycidyl ether was sprayed to these nonwoven fabrics impregnated with the reaction solution, and then allowed to react in a thermostat bath at 50° C. for 20 minutes. The obtained nonwoven fabrics supporting a gel-like metal-adsorbing material were immersed in a 50 mg/L copper sulfate solution adjusted to pH 5.5 to adsorb copper. From the amount of copper loss from the copper solution, the amount of copper adsorption of each nonwoven fabric supporting a gel-like metal-adsorbing material was determined. Table 3 shows the results. The obtained nonwoven fabrics supporting a gel-like metal-adsorbing material clearly adsorbed copper. However, it was shown that the amount of adsorption varies depending on the blend-spinning ratio of the nonwoven fabric, and a nonwoven fabric containing highly wettable rayon has a larger supporting amount. FIG. 3 shows an electron micrograph of the nonwoven fabric B supporting a gel-like metal-adsorbing material. It is shown that the gel-like metal-adsorbing material is supported on the fiber surface in a particulate form or a film form.

TABLE 3

Blend-Spinning Ratio of Nonwoven Fabric Used for Test and The Amount of Copper Adsorption of Nonwoven Fabric Supporting Gel-Like Metal-Adsorbing Material

| Nonwoven Fabric Supporting Gel-Like Metal-Adsorbing Material | A | B | C |
|---|---|---|---|
| Polyester % | 80 | 30 | — |
| Rayon % | — | 50 | 80 |
| Low-Melting-Point PET % | 20 | 20 | 20 |
| The Amount of Adsorption mmol/g | 0.2 | 0.4 | 0.4 |

INDUSTRIAL APPLICABILITY

According to the present invention, a metal-adsorbing polymer selected from polyethyleneimine and polyallylamine is crosslinked with a polyglycidyl ether, whereby a gel-like metal-adsorbing material having a large amount of metal adsorption can be produced. Further, a suitable porous carrier is impregnated with a metal-adsorbing polymer selected from polyethyleneimine and polyallylamine, followed by crosslinking in the same manner, whereby a metal adsorbent having a gel-like metal-adsorbing material supported, which shows high metal adsorption capacity and can meet various demands, can be produced. These metal-adsorbing materials are capable of highly adsorbing heavy metals in a wide pH range. Therefore, it is possible to remove heavy metals from waste water or service water, recover valuable metals from environmental water or metal-treated solutions, and further remove poisonous metals from food products or potable water. The gel-like metal-adsorbing material is characterized in that it releases water retained therein upon metal adsorption, and thereby shrinks in volume. As a result, it is possible to reduce the cost of metal recovery and also the number of processes. In addition, with respect to a metal adsorbent having a gel-like metal-adsorbing material supported on a porous carrier, the gel-like metal-adsorbing material can be supported on existing polymer carriers in various forms. Therefore, a metal adsorbent in a form capable of meeting various demands can be obtained.

The invention claimed is:

1. A gel-like metal-adsorbing material obtainable by crosslinking a metal-adsorbing polymer with a polyglycidyl ether, wherein the metal-adsorbing polymer is partially carboxymethylated polyallylamine obtained by reacting polyallylamine with halogenated acetic acid, a molar amount of halogenated acetic acid being 0.1 to 4 times a nitrogen amount in the polyallylamine such that the polyallylamine is partially carboxymethylated, wherein the gel-like metal-adsorbing material is able to absorb water therein and then release the water upon absorbing metals while shrinking in its volume.

2. A metal adsorbent comprising a gel-like metal-adsorbing material according to claim 1, which is obtained by impregnating a hydrophilic porous carrier with a metal-adsorbing polymer which is partially carboxymethylated polyallylamine, and then supporting the gel-like metal-adsorbing material crosslinked with a polyglycidyl ether on the porous carrier.

3. The metal adsorbent according to claim 2, characterized in that the hydrophilic porous carrier is a foaming polymer, a cloth, a resin-sintered porous body, a porous ceramic, or a porous glass.

* * * * *